(12) United States Patent
Zacker et al.

(10) Patent No.: US 9,453,561 B2
(45) Date of Patent: Sep. 27, 2016

(54) SPRING, BELT TENSIONING DEVICE, AND ASSEMBLY

(71) Applicant: Muhr Und Bender KG, Attendorn (DE)

(72) Inventors: Matthias Zacker, Attendorn (DE); Joachim Jud, Daaden (DE); Simon Pfeifer, Plettenberg (DE); Manfred Jung, Westerburg (DE)

(73) Assignee: Muhr und Bender KG, Attendorn (DE)

( * ) Notice: Subject to any disclaimer, the term of this patent is extended or adjusted under 35 U.S.C. 154(b) by 259 days.

(21) Appl. No.: 14/207,840

(22) Filed: Mar. 13, 2014

(65) Prior Publication Data

US 2014/0315673 A1 Oct. 23, 2014

(30) Foreign Application Priority Data

Mar. 13, 2013 (DE) ........................ 10 2013 102 562

(51) Int. Cl.
| | |
|---|---|
| *F16H 7/12* | (2006.01) |
| *F16F 1/04* | (2006.01) |
| *F16H 7/08* | (2006.01) |

(52) U.S. Cl.
CPC . *F16H 7/12* (2013.01); *F16F 1/04* (2013.01); *F16H 7/1218* (2013.01); *F16H 2007/081* (2013.01); *F16H 2007/0874* (2013.01); *F16H 2007/0893* (2013.01)

(58) Field of Classification Search
CPC .. F16H 7/12; F16H 7/1218; F16H 2007/081; F16H 2007/0874; F16H 2007/0893; F16F 1/04

USPC .......................................... 474/109–111, 135
See application file for complete search history.

(56) References Cited

U.S. PATENT DOCUMENTS

| | | | |
|---|---|---|---|
| 4,758,208 A | 7/1988 | Bartos et al. | |
| 2009/0298631 A1 | 12/2009 | Jud et al. | |
| 2011/0266730 A1 | 11/2011 | Muller et al. | |
| 2013/0040770 A1 | 2/2013 | Wolf et al. | |
| 2013/0079185 A1 | 3/2013 | Schauerte et al. | |
| 2015/0275751 A1* | 10/2015 | Cariccia | F02B 67/06 474/109 |

FOREIGN PATENT DOCUMENTS

| | | |
|---|---|---|
| DE | 102005039719 A1 | 3/2007 |
| EP | 2128489 B1 | 8/2011 |
| EP | 2557295 A2 | 2/2013 |
| EP | 2573423 A1 | 3/2013 |

OTHER PUBLICATIONS

German Search Report, Application No. EP14000910, dated Jun. 16, 2014.

* cited by examiner

*Primary Examiner* — William E Dondero
*Assistant Examiner* — Robert T Reese
(74) *Attorney, Agent, or Firm* — MacMillan, Sobanski & Todd, LLC (57) ABSTRACT

A spring, especially for use in a belt tensioning device, with a number of at least 1.25 and at a maximum 2.5 coils, which extend around a spring axis A8, wherein a first coil end 42 has an axial offset Va relative to a first coil region 48, arranged at an angle of 360° around the spring axis A8, and wherein a second coil end 49 has an radial offset Vr relative to a second coil region 50 arranged at an angle of 360° around the spring axis A8. A belt tensioning device and an assembly with such a belt tensioning device include such a spring.

14 Claims, 7 Drawing Sheets

SPRING, BELT TENSIONING DEVICE, AND ASSEMBLY

BACKGROUND OF THE INVENTION

This invention relates to a belt tensioning device for a belt drive, which comprises a continuous belt and at least two belt pulleys, of which one serves as a drive and one as an output of the belt drive. Such belt drives are especially used in combustion engines of a motor vehicle for driving auxiliary units, wherein a first belt pulley rests on the crank shaft of the combustion engine and drives the belt. Further belt pulleys are assigned to the auxiliary units, as for example a water pump, an electric generator or an air conditioning compressor and are rotatably driven by the belt drive. In common belt drives, the auxiliary units are designed as consumers, which means, they are driven by the belt pulley of the crank shaft via the belt. In this case, the undriven side of the belt is arranged between the crank shaft and the unit following in circumferential direction of the belt, generally the generator. To ensure a sufficient contact of the belt around the belt pulley, the belt is pre-tensioned by means of a tensioning pulley of the belt tensioning device.

Also belt drives are known, in which a starter-generator unit is integrated into the belt drive as a further auxiliary unit, i.e. an electro motor, which can be operated depending on the operational condition as a starter (car starter) or a dynamo (generator). During the normal- or engine operation, the belt pulley on the crank shaft is the driving pulley, while the starter-generator as well as the other residual units are driven. During the starting or cranking operation, the starter-generator drives via the corresponding belt pulley the crank shaft, to start the combustion engine. In such belt drives with starter-generator as auxiliary unit a change between the driving side and the undriven side to both sides of the belt pulley of the starter-generator unit takes place between the engine operation and the starting operation. Thus it is necessary, to provide spring-loaded tensioning pulleys for both named sides, of which respectively one pulley is acting onto the undriven side by means of a spring force, while the other pulley is pushed back by the tensioned driving side.

From EP 2 128 489 A2 a belt tensioning device for a belt drive with a starter-generator unit is known. The belt tensioning device has a housing, in which two tensioning arms are pivotably supported around a common pivot axis. The tensioning arms are supported on each other by means of spring means. The housing can be mounted while the drive belt pulley has already been mounted on the starter-generator From U.S. Pat. No. 4,758,208 B a system for a belt drive with a starter-generator unit is known. The housing of the starter-generator unit is mounted on the engine block and such, that the housing is rotatable in a limited manner around the axis of rotation of the drive pulley. The belt tensioning device comprises two tensioning arms, which are pivotable scissor-like relative to each other around the drive shaft. Between the tensioning arms a tensioning spring is arranged, which acts on both the tensioning arms towards each other.

From DE 10 2011 053 869 A1 of the applicant, a belt tensioning device with exactly one tensioning arm is known, which is supported via a helical spring relative to the base member in circumferential direction.

The available installation space around the generator axis as well as before and behind the belt plane is especially limited for two tensioning devices or a double arm tensioning device. Furthermore, the mounting of the belt is difficult, not at least because of the installation space conditions. Depending on the design of the belt tensioner high torques acting on the belt tensioner can result, which may lead to an increased wear.

SUMMARY OF THE INVENTION

The present invention is based on the object, to propose a spring, which is compactly constructed and thus especially suitable for the use in a belt tensioning device. The object is further, to propose a belt tensioning device for a belt drive, which is compact in design, easily mountable and which allows an advantageous force flow between the belts and the active parts of the belt tensioning device. Furthermore, an assembly with such a belt tensioning device is proposed, which has a compact design, is easily mountable and which can overcome the above named disadvantages.

A solution is a spring, especially for the use in a belt tensioning device, with a number of at least 1.25 and at a maximum of 2.5 coils (windings), which extend around the spring axis, wherein a first coil end has an axial offset relative to a first coil region arranged at an angle of 360° around the spring axis relative to the first coil end, and wherein a second coil end has a radial offset relative to a second coil region arranged at an angle of 360° around the spring axis relative to the second coil end. In this connection the first and second coil ends refer to the ends of the coils, extending around the spring axis with a concave arch. A further end portion, which for example is bent radially outward or in axial direction, can respectively follow the first and/or second coil end. Arranged at 360° around the spring axis means a region which is arranged one winding away from the respective end portion of the spring.

An advantage is, that the spring as a whole has such a flat lay-out, so that also an assembly equipped with the spring according to the invention, can be formed compact. The spring has a minimal axial construction height in the circumferential portion, in which the second coil end is arranged, which height in an extreme case corresponds only to the largest wire diameter of the spring wire. Thus, there is enough space available in this circumferential portion for other components, like a tensioning pulley. At the same time the spring has the desired spring characteristics because of the circumferential extension of 1.25 up to 2.5 coils, i.e. 450° to 900° angular extension around the spring axis.

According to a preferred embodiment the first coil end has an axial distance (Va) relative to the first coil region which is smaller than three times the diameter (d8) of the spring wire (Va<3·d8), especially smaller than twice the spring wire diameter (Va<2·d8), if necessary even smaller than one time the spring wire diameter (Va<d8). Alternatively or in addition hereto, the second coil end can have a radial distance (Vr) relative to the second coil region, which is smaller than three fold a diameter (d8) of the spring wire (Vr<3·d8), especially smaller than twice the spring wire diameter (Vr<2·d8), if necessary even smaller than the spring wire diameter (Vr<d8). The first coil end can have a radial overlapping relative to the first coil region arranged at an angle of 360° around the spring axis thereto, whereby a radially compact design is achieved in this overlapping circumferential portion. Alternatively or in addition hereto, the second coil end can have an axial overlapping relative to the second coil region arranged 360° further around the spring axis, whereby a small axial design height is achieved in this overlapping circumferential portion. The two coil ends of the spring are preferably offset relative to each other by 180°±30° in circumferential direction, i.e. any value between 150° and 210° relative to each other, other values not being excluded.

According to a preferred embodiment a first coil portion extending from the first coil end towards the first coil region is arranged in a first plane. This especially means, that a spring centre line of the first coil portion is arranged in a plane, wherein under consideration of the manufacturing tolerances, also a certain offset of the spring centre line from the plane of up to ±5% in relation to the spring wire diameter should be comprised. Alternatively or in addition a second coil portion extending from the second coil end towards the second coil region may be arranged in a second plane. Here, the above stated definition for "in a plane" is correspondingly valid. The two planes are preferably arranged parallel to each other and extend respectively at least essentially at a right angle to the spring axis. By means of this design flat abutment faces of the end-sided coil portions are produced, which again is advantageous for a flat structure of the spring, but also for the connection components, on which the spring is axially supported in the assembled condition. The support faces can especially be formed for accommodating the first or second coil portion, respectively as radial faces.

Preferably, an incline portion is provided between the first coil portion and the second coil portion. This incline portion extends especially around 45° to 90° around the spring axis, but other values are not excluded. The shorter the rising portion the larger the end-sided coil portions, arranged respectively in one plane, can be formed, so that a good and constant support in relation to a connection component can be achieved.

Furthermore, the above named object is solved by a belt tensioning device for a belt drive, wherein the belt drive has at least one unit with a housing, with a drive shaft and with a belt pulley, as well as a continuous belt for driving the belt pulley, wherein the belt tensioning device comprises the following: a base member with attachment means for connecting the belt tensioning device to the unit and with an opening, into which the drive shaft extends at least partially in the assembled condition; two tensioning arms, which are pivotably supported on the base member around a pivot axis and are supported via a spring element in circumferential direction relative to each other, wherein the pivot axis is arranged in the assembled condition within an outer diameter of the belt pulley of the unit; for each tensioning arm, a tensioning pulley for tensioning the belt, wherein the tensioning pulleys are respectively rotatably supported on the corresponding tensioning arm around an axis of rotation; wherein the spring element is in the form of a wound spring, which extends around the pivot axis and has at least 1.25 and at a maximum 2.5 coils (windings).

The unit can in principle be any machine, which forms part of the belt drive, this means especially any of the auxiliary units driven by the main engine of the motor vehicle. Insofar, the unit can also be called a work machine. It is especially provided, that the unit is formed as a generator, with which the belt tensioning device is connectable in a fixed manner. However, it is obvious, that the belt tensioning device according to the invention can also be provided on any other auxiliary unit of the belt drive, as for example on a water pump. "Connectable in a fixed manner" means an embodiment, in which the belt tensioning device is manufactured as a separate component and is later connected to the machine, for example by means of a screw connection. The connection of the belt tensioning device can for example be achieved on a front plate of the unit or an adjoining assembly group. Preferably, the belt tensioning device is directly mounted on the unit, respectively on a part of the housing of the unit.

As the belt tensioning device is directly mountable on the unit, a very compact construction is achieved in an advantageous manner. The belt tensioning device can especially be arranged at the end side on the unit, so that no separate space has to be made available in the engine compartment between the crank shaft and the unit. Furthermore, no further connection means are necessary for the belt tensioning device on the engine block. In total the belt tensioning device can be configured independently from the space condition in the engine compartment. As the pivot axis of the tensioning arm is arranged within the outer diameter of the belt pulley, the belt tensioner is arranged in an axial view within an envelope of the unit, so that also the radial design space is small.

Because of the two tensioning arms, supported on the base member, the belt tensioning device has a decoupling effect on the rotational oscillations occurring at the unit. The forces acting on the belt via the spring are always constant because of the elastic support of the two tensioning arms. The tensioning arms can pivot or move, respectively, around the base member in direction of the lowest energy level into the position, in which the forces are at an equilibrium. The total resultant produced by the forces acting on the tensioning pulleys, always extends through the axis of the unit.

The two tensioning arms are pivotably supported relative to the base member around the pivot axis and are supported relative to each other in circumferential direction by means of the wound spring. The two tensioning arms are pushed towards each other, respectively in the direction of the belt, to tension the same. It is provided, that the number of coils of the wound spring is at least 1.25 and at most 2.5 including any value therebetween. A coil in this connection means one 360° winding or turn of the spring, and can thus also be refereed to as winding or turn. This means, the wound spring has a circumferential extension of approximately 450° to 900° around the pivot axis of the tensioning arms. A number of 1.5 to 2 coils is especially preferred, corresponding to a circumferential extension of approximately 540° to 720°. The ends of the spring can be cranked radially outward or in axial direction and are supported on corresponding abutments on the first and second tensioning arm in rotational direction.

According to a first possibility, the wound spring can be configured in the form of a helical spring. In this case, the coils are arranged at least partially axially next to each other or the coils have at least partially a rising component in axial direction. According to a second possibility, the spring can also be configured as a spiral spring, this means the coils have a rising component in radial direction. In this case, the coils are arranged essentially in one plane or in a longitudinal sectional view through the spring at least partially radially neighboring each other. A further possibility can be a combination of the first and the second possibilities, this means the wound spring can have coil portions according to the type of a helical spring and/or according to the type of a spiral spring, as well as coil portions, which have a rising component in the axial as well as in the radial direction. A spring formed such and which also can be referred to as a combined helical and spiral spring, offers the advantage of an especially flat design with at the same time good spring characteristics.

Independently of the precise embodiment, the wound spring has in relation to its nominal diameter a relative small axial length, which means that the diameter of the helical spring is relatively large. For a flat design it is especially advantageous, when in the assembled condition of the spring the ratio of the diameter of the wound spring to the axial length is larger than 3.0, especially larger than 5.0, preferably larger than 7.0. Thus it is enabled, that the belt tensioning device can be mounted at the end side on the unit, without consuming additional space in the area of the unit or between the crank shaft and the unit. An upper limit for the ratio of the diameter of the spring to its axial length in the assembled condition can be for example 9.0 or above, without being limited thereto. When using a wound spring with spiral portion the named diameter refers to the largest diameter of the coils of the spring. It is obvious, that the named ratio between diameter and axial length of the wound spring also depends on the wire diameter of the spring wire. The larger the wire diameter the stiffer the spring, which means that the axial length or the diameter of the spring respectively can be formed smaller, and vice versa.

The ratio of the largest radius of the wound spring and the distance of the axis of rotation of one of the tensioning pulleys to the pivot axis of the tensioning arms can be smaller than 1.5, especially smaller than 1.3, preferably even smaller than 1.0. Thus, the spring can engage a relative large diameter on the tensioning arms, so that a good pre-tensioning of the tensioning arms on the belt is achieved.

According to a preferred embodiment, the base member is formed such, that—in the mounted condition of the belt tensioning device on the unit—the pivot axis of the two tensioning arms is arranged within the outer diameter of the drive shaft, essentially coaxially to the axis of rotation of the drive. In this way, an especially compact construction and an advantageous support are achieved. The opening of the base member has a smallest inner diameter, which is larger than the largest outer diameter of the belt pulley. In this way, the belt tensioning device can also be attached later on the unit, when the drive pulley is already mounted.

Preferably, the base member is made from a steel component, especially as a formed part from sheet metal. Thus, a high strength and rigidity with a low use of material is achieved. The attachment portion of the base member can project flange-like from the portion surrounding the opening and through or into which the drive shaft extends. It is advantageous, when the attachment portion has several attachment points, at which the base member can be connected to the unit. These attachment points can for example be formed as flange expansions of the base member, which project from a sleeve-like portion radially outward. Preferably, said attachment means are arranged at least in the circumferential portion, which is more or less arranged opposite to the tensioning arms and the drive belt leading away from the belt pulley. For a reliable attachment of the belt tensioning device on the unit it is advantageous, when the attachment means, when seen in an axial view onto the belt pulley, extend over a circumferential portion of more than 90° and less than 270°, especially of approximately 150° to 210°.

According to a first possibility the belt tensioning device is formed such, that the bearing means of the tensioning arms are arranged in the area between the attachment portion of the base member and the belt plane. This also applies for the wound spring, which pre-tensions the tensioning arms against each other, which is also arranged between the centre plane of the belt and the attachment portion. The belt plane corresponds more or less to a first bearing centre plane, which is defined by the bearings of the tensioning pulleys on the tensioning arms. A second bearing centre plane is formed by the bearings of the tensioning arms on the base member.

According to a second possibility the belt tensioning device is formed such, that the bearing means of the tensioning arms on the base member are arranged behind the belt plane, when seen from the unit. This means, that a centre plane of the tensioning arm bearing is arranged axially offset in relation to the centre plane of the belt in direction towards the engine compartment. The second bearing centre plane and the attachment means for attaching the base member are arranged on different sides of the first bearing centre plane of the tensioning pulleys, in this possibility.

According to a preferred embodiment the first tensioning arm has a first support face, against which the spring is axially supported, and the second tensioning arm has a second support face, on which the spring is axially supported. Thus, the wound spring is axially pre-tensioned and fixed between the two tensioning arms. The two tensioning arms are freely rotatable relative to the base member respectively over an angular range of 360° around the pivot axis, whereby a good assembly is achieved.

According to a first embodiment of the bearing means, the two tensioning arms are respectively radially and axially supported on the base member and in this case, are arranged next to each other. According to a second embodiment, the first tensioning arm is radially supported on the base member and the second tensioning arm is radially supported on the first tensioning arm. Thus, a nested bearing arrangement is achieved. The spring is preferably arranged with radial distance around the bearing portions of the first and the second tensioning arm and covers at least one of the bearing portions at least partially in axial direction. The largest radius of the wound spring is preferably smaller than the radius of the attachment points of the base member to the rotational axis of the drive and is smaller than the distance between the tensioning pulley axis and the rotational axis of the drive.

The above named object is also solved by an assembly for a belt drive, the assembly comprising a unit with a housing, a drive shaft and a belt pulley, as well as a belt tensioning device formed according to one or more of the above named embodiments; wherein the base member of the belt tensioning device is fixed to the housing of the unit; and wherein the drive shaft extends at least partially into the opening of the base member. Thus, a compact design is achieved independent of the available space in the engine compartment as mentioned above so that it can be referred to the above description. Preferably, the unit is a generator, however can also be any other of the auxiliary units or machines, for example a pump, driven by the main engine. The assembly comprises the unit and the belt tensioning device connected thereto.

The belt tensioning device and the unit are preferably formed as separate assemblies, which are later connected to each other by means of suitable connection means, for example by means of screw connections. However, it is also possible, that the belt tensioning device and the unit form together one assembly, wherein the base member of the belt tensioning device and the housing of the unit would then be formed as an integral component. The belt tensioning device can have any of the above embodiments.

Various aspects of this invention will become apparent to those skilled in the art from the following detailed description of the preferred embodiment, when read in light of the accompanying drawings.

BRIEF DESCRIPTION OF THE DRAWINGS

FIG. 1 illustrates a spring according to the invention in a first embodiment: a) in a perspective view, b) in an axial view, c) in a side view, and d) according to intersecting line I-I of FIG. 1b).

FIG. 2 illustrates a belt tensioning device according to the invention in a first embodiment: a) in a perspective exploded view, b) in a perspective view in an assembled condition with the drive belt pulley, and c) in a longitudinal sectional view.

FIG. 7 illustrates a belt tensioning device according to the invention in a third embodiment: a) in a perspective exploded view, and b) in a longitudinal sectional view.

DETAILED DESCRIPTION OF THE PREFERRED EMBODIMENT

Figure 1A:
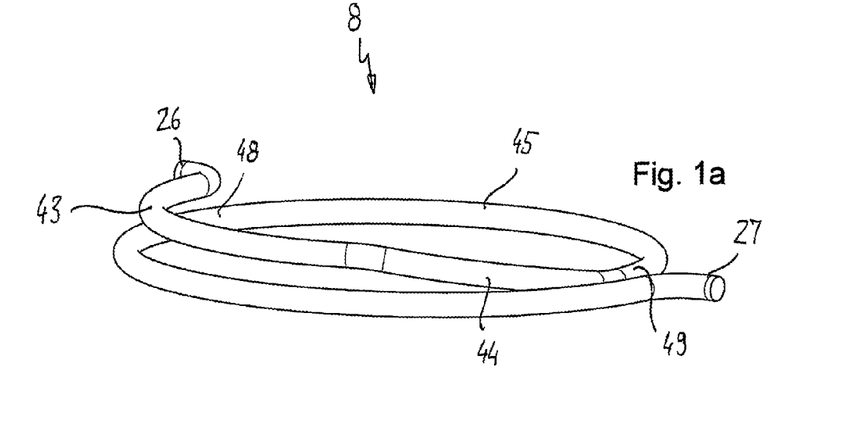

FIGS. 1a) to 1d), which are commonly described in the following, show a spring 8 according to the invention in a first embodiment. The spring 8 has approximately 1.5 coils, or windings. In other words, the spring extends across 540° around the spring axis A8, wherein also any other number of coils between a minimum of 1.25 and a maximum of 2.5 (450° and 900°) may be considered. The spring 8 has, starting from a first end portion 26, bent radially outward, a first coil portion 43, which extends in a plane E43 with a constant radius R43 over an angle range of approximately 110° to 120° around the spring axis A8. A coil portion means, that the spring is wound in this portion around the spring axis with a concave inner curvature. The plane E43 which is defined by the first coil portion 43, is arranged substantially at a right angle to the spring axis A8. The first coil portion 43 without an incline is followed by a transition—or incline portion 44, which extends across an angle range of approximately 60° to 70°. The spring 8 leaves the plane E43 in the incline portion 44, which means the spring has a rising component in the axial direction in said portion 44. The incline portion 44 ends in a second coil portion 45, which is arranged in a plane E45 extending parallel to plane E43. The second coil portion 45 extends, starting from the incline portion to the end of the coil portion 45, across approximately a full coil, which means an angle range of approximately 360°. A second end portion 27, which is bent radially outward, follows the end of the second coil portion 45.

Figure 1B:
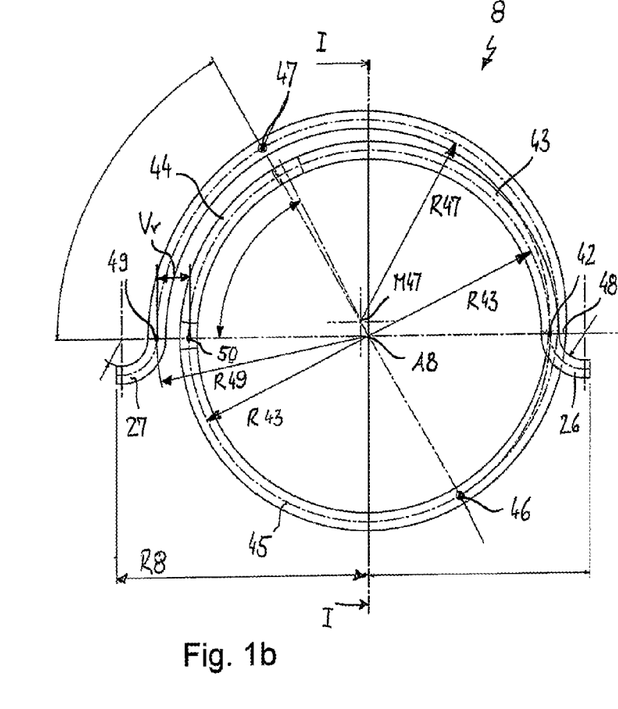
Figure 1C:
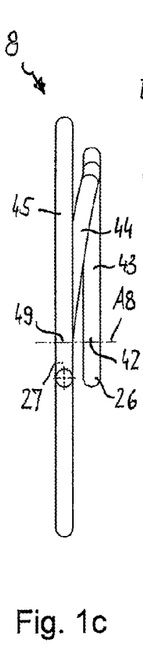
Figure 1D:
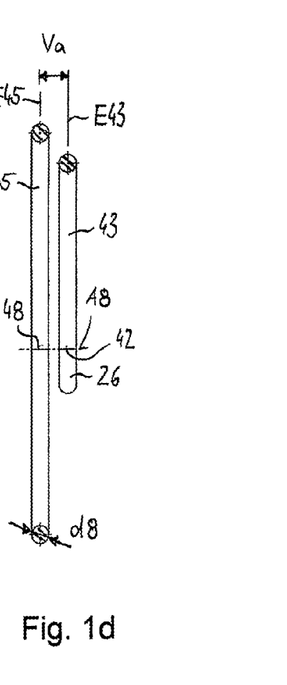

In relation of the spring axis A8, the spring 8 has a constant radius R43 across the first coil portion 43, the incline portion 44 and a part of the second coil portion 45. The circular arc with the radius R43 extends starting from the coil end 42 up to a first transition region 46 of the second coil portion 45. The second coil portion 45 has, starting from this first transition region 46 to the second transition region 47 in relation to the spring axis A8, a spiral extension, such that the spring 8 has a radial rising component and leaves the first radius R43 in a radially outward direction. This is achieved by a radius R47, which is larger than the radius R43 and whose centre point M47 is offset relative to the spring axis A8. Starting from the second transition region 47 to the coil end 49, the second coil portion 45 has a constant radius R49 around the spring axis A8, which is larger than the radius R43 of the first coil portion 43. In FIG. 1b) it is visible, that this end portion of the second coil portion 45 extends coaxially to the rising portion 44.

It is understood, that the stated angle ranges and extensions of the radii are exemplary and insofar also angle ranges or radii deviating therefrom could be selected. Essential design features of the spring 8 are, that the first coil end 42 has an axial offset in relation to the coil region 48 arranged one winding further thereto, respectively by 360° around the spring axis A8, and that the second coil end 49 has a radial distance Vr relative to the coil region 50 arranged one winding further thereto, i.e. by an angle of 360°.

In this case, the axial offset Va and the radial offset Vr, respectively, are smaller than a largest diameter d8 of the spring wire. The first coil end 42 has a radial overlapping to the coil region 48 arranged at an angle of 360° relative thereto, whereby in this circumferential area of the spring a small design size is achieved in radial direction. Furthermore, the second coil end 49 has an axial overlapping to the coil region 50 arranged at an angle of 360° relative thereto, whereby a specially flat design is achieved in this circumferential area. The two coil ends 42, 49 of the spring 8 are offset relative to each other by approximately 180° in circumferential direction, wherein certain deviations of preferably up to ±30° may be selected.

Essential design features of the spring 8 are especially, that it has at least a screw-like portion with a constant radius along the circumference (R43, R49) and at least one spiral-like portion with a variable radius in relation to the spring axis A8 along the circumference (R47), as well as two coil portions 43, 45, which extend in two planes E43, 45 arranged parallel to each other. Thus, an especially compact design of the spring 8 with flat (plane) abutment faces is achieved.

Figure 2A:
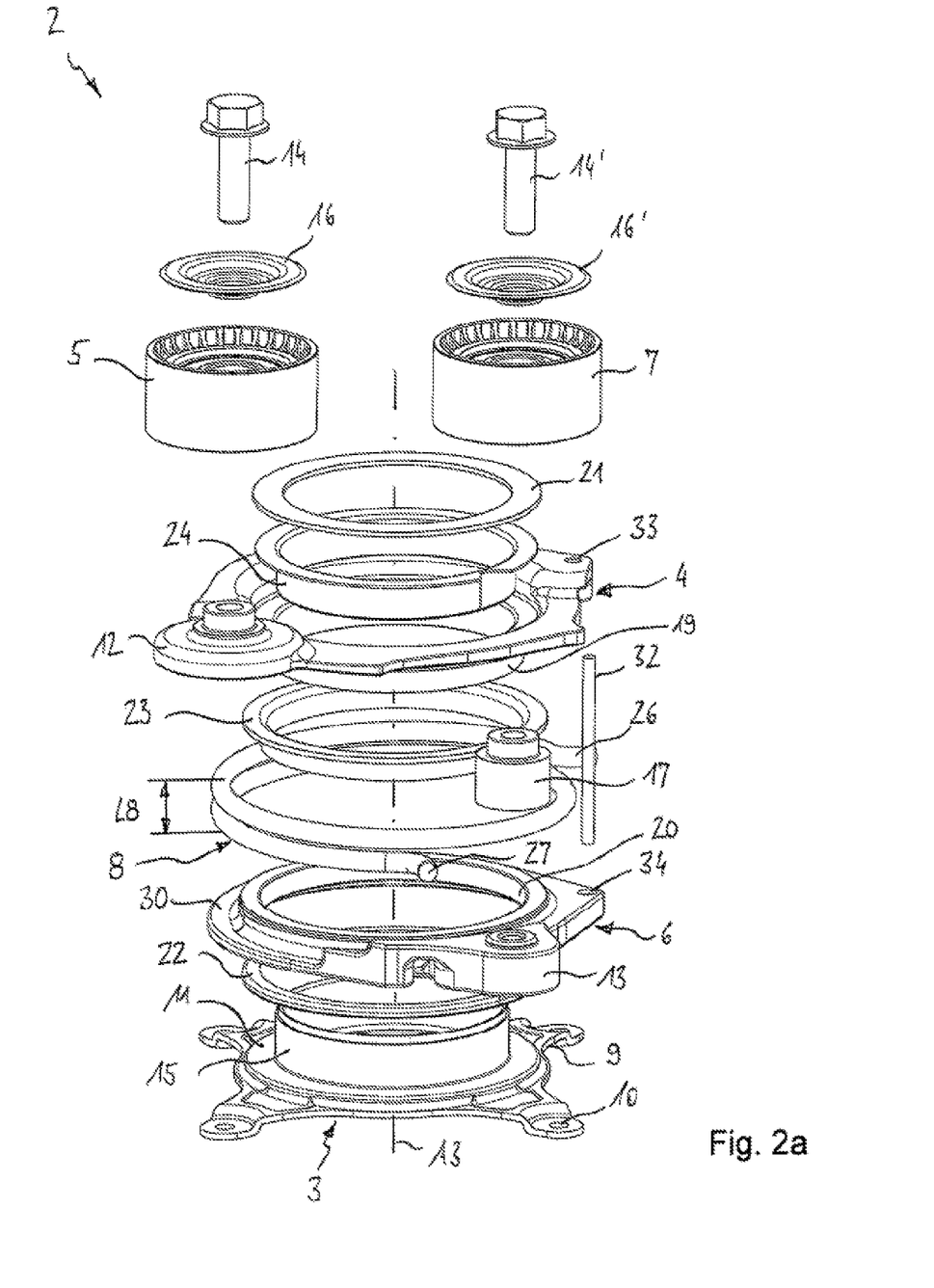

FIGS. 2a), 2b) and 2c), which are described together in the following, show a belt tensioning device 2 according to the invention in a first embodiment. The belt tensioning device 2 comprises a base member 3, a first tensioning arm 4 with a first tensioning pulley 5, a second tensioning arm 6 with a second tensioning pulley 7 and a spring element 8, which biases the two tensioning arms 4, 6 against each other in circumferential direction. The spring element 8 can be designed as shown in FIG. 1a) to 1d) or, as shown here, can have a slightly modified structure.

Figure 2B:
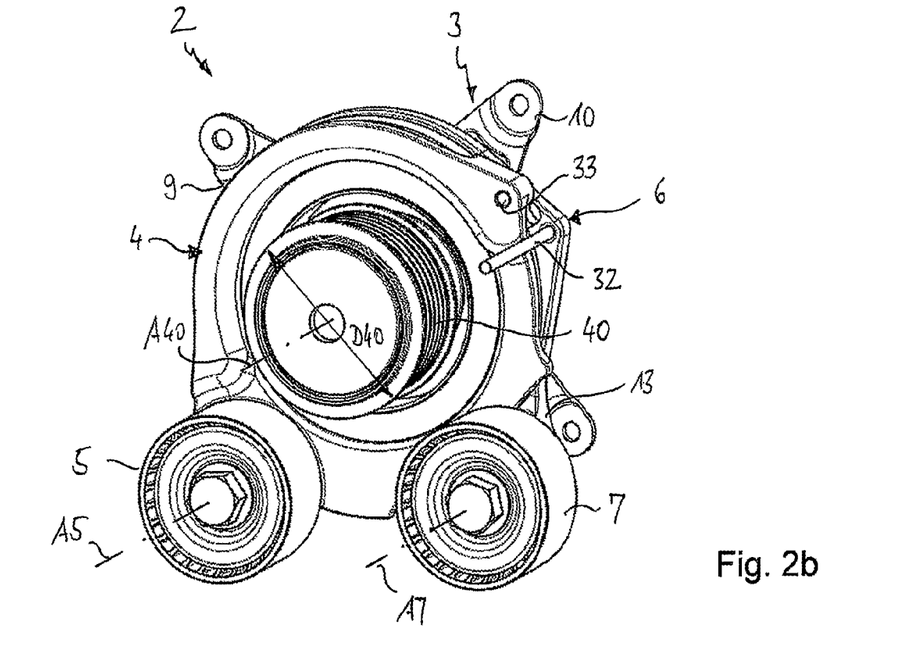
Figure 2C:
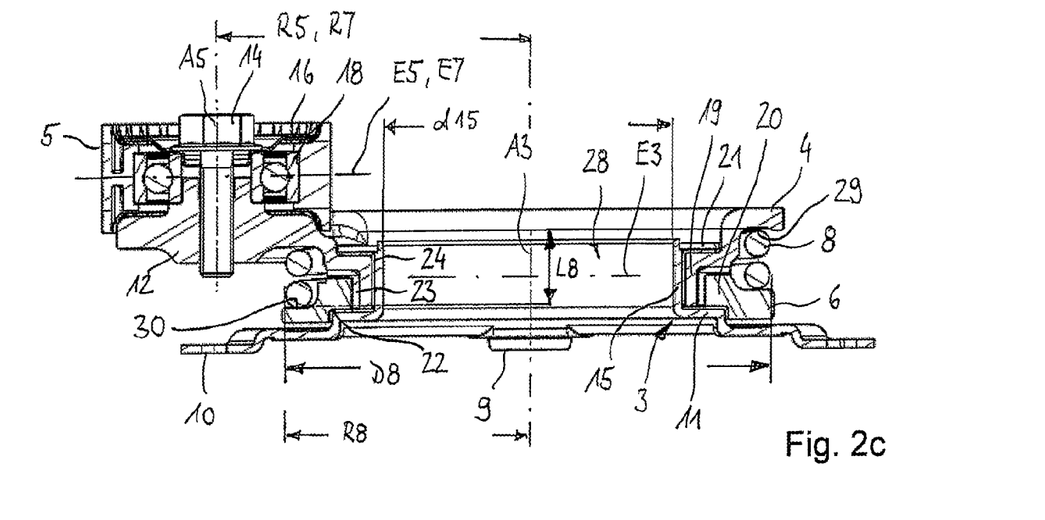

The base member 3 can be mounted on a unit or can be mounted on a component connected to the unit. The unit can be in principle any machine, which is part of the belt drive, this means especially any of the auxiliary units driven by the main engine of the motor vehicle, like generator, water pump or similar. The base member 3 has an attachment portion 9 for being connected to the unit. The attachment portion 9 comprises four flange projections 10 which are distributed along the circumference and project radially outward with respective bores, through which the screws can be passed for attachment on the unit. The belt tensioning device according to the present embodiment is formed such, that the bearing means of the tensioning arms 4, 6 is arranged between the unit or the attachment portion 9 of the base member 3, respectively, and the middle belt plane, which is formed by the belt in the mounted condition.

The base member 3 has furthermore a flange portion 11, which is connected to a radially inner end of the attachment portion 9 and which serves for axial supporting the second tensioning arm 6. The flange portion 11 ends radially inward in a sleeve portion 15, on which the first and second tensioning arm 4, 6 respectively is radially supported. On the free end of the sleeve portion 15, an annular disc 21 is fixed as a closure. This is achieved in the present case by means of bordering an end-sided edge of the sleeve portion 15, wherein other attachment methods may also be considered. The annular disc 21 forms a support face for the axial support of the first and second tensioning arm 4, 6 respectively. Together the annular disc 21, the sleeve portion 15 and the flange portion 11 form a receptacle for the two tensioning arms 4,6, which is formed approximately C-like in a half longitudinal sectional view. The base member 3 is formed as a steel component, which can be formed from sheet metal, wherein it is obvious, that also other materials and manufacturing methods are possible.

The two tensioning arms 4, 6 are pivotable respectively in relation to each other around the pivot axis A3, wherein the spring element 8, effectively arranged between the two tensioning arms 4, 6, counteracts the pivot movement. The assembly comprising the two tensioning arms 4, 6 and the spring element 8 is freely rotatable in relation to the base member 3 around the pivot axis A3, this means across 360° and more. It is provided, that the pivot axis A3 is arranged in the mounted condition of the belt tensioning device 2 within the diameter of the drive belt pulley 40 of the unit 35, preferably essentially coaxially to the drive axis A40 of the drive belt pulley.

The tensioning arms 4, 6 have respectively a support portion 12, 13, which projects radially outward from a ring portion of the respective tensioning arm 4, 6. A respective tensioning pulley 5, 7 is mounted on each support portion 12, 13 so as to be rotatably supported around axes of rotation A5, A7 by means of corresponding bearings 18, 18', which axes of rotation being parallel to the pivot axis A3. The bearing 18 of the first tensioning pulley 5 is mounted on a journal of the support portion 12, into which a screw 14 is screwed in for the fixation. The second tensioning pulley 7 is rotatably supported on an intermediate element 17, which is fixed to the second support portion 13 by means of the screw 14'. Discs 16, 16' prevent the entering of dirt into the bearings 18, 18' of the tensioning pulleys 5, 7.

The first tensioning arm 4 has radially inward a bearing portion 19 being rotatably supported on the basic body 3. The second tensioning arm 5 has a bearing portion 20 being rotatably supported relative to the first support portion 19 and to the basic body 3, respectively. It is visible, that the first bearing portion 19 and the second bearing portion 20 are nested in one another. The second bearing portion 20 is axially supported by means of a bearing 22 relative to the base member 3, which is especially formed as a bearing disc, which is accommodated in an inner annular recess of the second tensioning arm 6 and is arranged on an annular shoulder 11 of the base member 3. Between the first and the second bearing portion 19, 20, a further bearing 23 is provided, which is especially formed in the form of a L-like sliding ring, when seen in cross section, and which forms an axial and radial bearing between the two tensioning arms 4, 6. For the support in opposite axial direction, a third bearing 24 is provided, which is formed especially in the form of a L-like sliding ring, when seen in cross-section, and forms an axial and radial bearing for the first tensioning arm 4 relative to the base member 3. The third bearing 24 is axially supported relative to the annular disc 21, which is mounted by means of bordering of the end-sided collar of the sleeve portion 15, after the first bearing 22, the second tensioning arm 6, the second bearing 23, the first tensioning arm 4 and the third bearing 24 have been mounted on the base member 3. The tensioning arms 4, 6 are arranged at least substantially in one plane with the bearings 23, 24, so that the axial design space is small.

The spring 8 is a wound spring element, which extends in the assembled condition in circumferential direction around the pivot axis A3. In other words, the spring axis A8, which for example is defined by the sum of the average diameter of the coils, is arranged at least substantially coaxially to the pivot axis A3 of the basic body 3. Substantially coaxially means, that a certain offset of the spring axis A8 to the pivot axis A3 is possible, especially in wound spring elements with spiral-like portion. The spring 8 has in the present case the form of a helical spring, which number of coils is between 1.25 and 2.5 (correspondingly 450° to 900°) including each value in between. A first end portion 26 of the spring 8 is supported relative to the first tensioning arm 4 in circumferential direction and the second end portion 27 is supported relative to the second tensioning arm 6 in circumferential direction. The two end portions 26, 27 are, respectively, bent radially outward and are circumferentially supported in corresponding seatings of the tensioning arms 4, 6.

The spring 8 is arranged between a support face 29 of the first tensioning arm 4 and a support face 30 of the second tensioning arm 6 with axial bias. Thus, the spring 8 is axially held in a play-free way relative to the tensioning arms 4, 6, so that no unwanted noises are produced. The support faces 29, 30 of the two tensioning arms 4, 6 extend in circumferential direction and have, respectively, the form of a ramp, which is adapted to the rise of the helical spring 8.

The spring 8 is heavily pre-tensioned in the assembled condition in circumferential direction; this means that the spring 9 is expanded relative to its relaxed condition, so that the spring 8 acts on the two tensioning arms 4, 6 in a direction towards each other. For the (temporary) fixing of the pre-tensioned position, the tensioning arms 4, 6 are moved away from each other against the pre-tensioning force of the spring 8 and a locking pin 32 is inserted into a first bore 33 in the first tensioning arm 4 and into a second bore 34 in the second tensioning arm 6. After the assembly of the belt tensioning device 2 on the assembly 35 and application of the belt 39, the locking pin 32 is removed, so that the spring 8 acts on the tensioning arms 4, 6 towards each other in circumferential direction and the tensioning pulleys 5, 7 bias the belt 39.

Because of the low number of coils, also referred to a windings, the spring 8 has a short axial length, which leads to a very small axial construction size of the belt tensioning device 2. The ratio of the diameter D8 of the spring 8 to the axial length L8 of the spring 9 in the assembled condition, which is in the present case approximately 6.0, has to be emphasized. Thus, a very compact arrangement is achieved with at the same time good spring characteristics. It is obvious, that the invention is not limited to this ratio. Rather, also other values are possible, wherein the ratio of the diameter to the axial length is preferably in a range of larger than 5.0, especially larger than 7.0. The selection of the ratio depends also on the wire diameter of the spring wire, wherein it is valid, that with increasing diameter of the wire the stiffness of the spring increases and vice versa.

Furthermore, it can be recognized, that the largest radius R8 of the helical spring 8, which corresponds to the half of diameter D8/2, is relative large in relation to the axis distance R5, R7 between the rotational axes of the tensioning pulleys A5, A7 and the pivot axis A3. In the present case, the ratio R5/R8 is approximately 1.35, wherein it is obvious, that also other values are possible. Preferably, the ratio of the average radius R8 of the spring 8 to the axis distance R5 is smaller than 1.5, especially smaller than 1.3 or even smaller than 1.0 and larger then 0.5, especially larger than 0.7. Thus, high pre-tensioning forces of the tensioning pulleys 5, 7 can be achieved on the belt 39.

Figure 3:
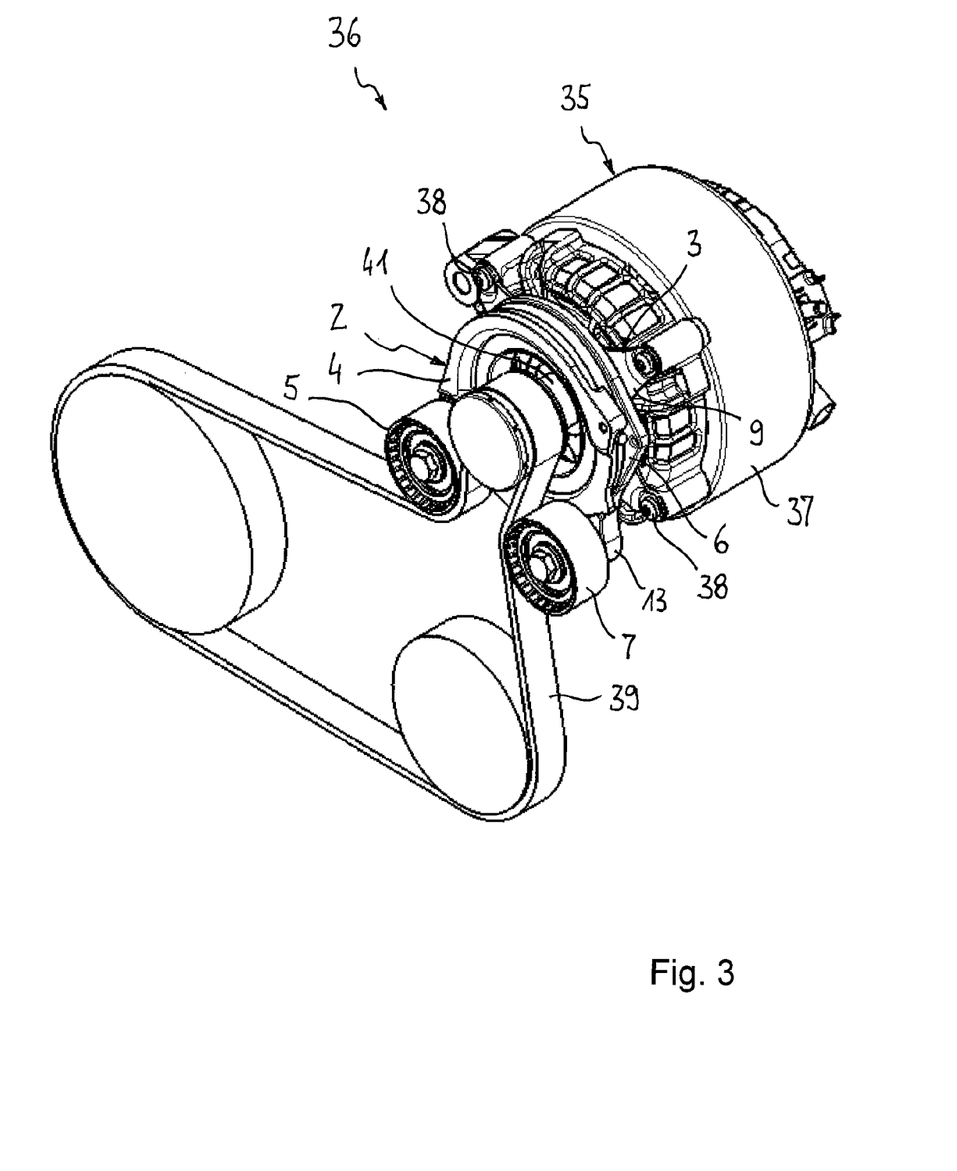
FIG. 3 illustrates an assembly according to the invention with a belt tensioning device of FIG. 2 according to the invention in a perspective view.

FIG. 3 shows the belt tensioning device 2 according to the invention and according to the FIGS. 2a) to 2c) in the assembled condition on a unit 35. In this case, the belt tensioning device 2 and the unit 25 form together an assembly 36. The assembly 35 is in the present case in the form of a generator (alternator). The housing 37 of the generator is visible, which can be connected via attachment means to an engine block. It is, however, also obvious, that the unit can also be a different machine, which is part of the belt drive, for example, an auxiliary assembly, like a pump.

The belt tensioning device 2 is mounted at the front end on the generator 35. This is achieved by means of the circumferentially distributed connection flanges 10, through which screws 38 are inserted and screwed to the housing 37 of the generator 35. Furthermore, the continuous belt 39 and the belt pulley 40 are visible. The belt pulley 40 can be connected to the drive shaft 41 of the generator 35 by suitable means like a screw.

The base member 3 and the belt tensioning device 2, respectively, are formed such, that—in the assembled condition of the belt tensioning device 2 on the unit 35—the pivot axis A3 of the tensioning arms 4, 6 is arranged within the outer diameter of the drive shaft, preferably essentially coaxially to the axis of rotation of the drive.

Figure 4:
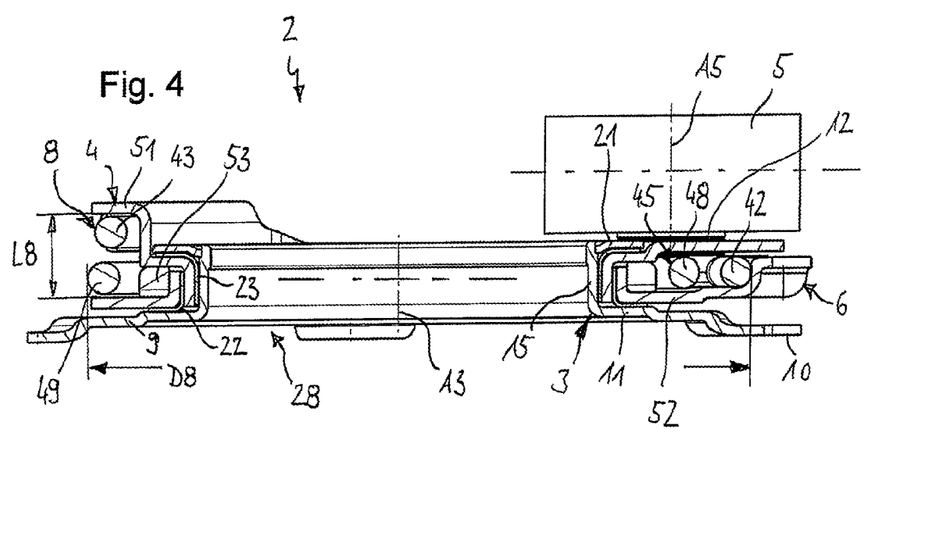
FIG. 4 illustrates a belt tensioning device according to the invention in a second embodiment in a longitudinal sectional view with an inventive spring according to FIG. 1.

FIG. 4 shows a belt tensioning device 2 according to the invention in a further embodiment. The present belt tensioning device 2 corresponds to a great extent to the embodiment according to FIGS. 2a) to 2c), so that concerning the commonalities it is referred to the above description. In this case, the same or modified components are provided with the same reference numerals as in FIGS. 2a) to 2c). The spring 8 of the embodiment shown in FIG. 4 corresponds to the spring, shown in FIGS. 1a) to 1b), so that concerning this, it is referred to the above description, the same details are provided with the same reference numerals as in FIG. 1.

A special feature of the embodiment according to FIG. 4 is, that the assembly position of the spring 8 is selected such relative to the tensioning arms 4, 6, that the two support portions 12, 13, respectively the tensioning pulleys 5, 7 of the tensioning arms 4, 6 mounted thereon, are arranged in the circumferential area of the spring 8, in which the spring 8 has the flattest possible structure. In this flat circumferential area, the spring 8 has an axial thickness, which corresponds only to the diameter d8 of the spring wire. This flat circumferential portion, which is formed by a part of the second coil portion 45, is visible in the right half of the sectional view of FIG. 4. In the opposite circumferential portion, the first coil portion 43 is arranged, which is axially distanced relative to the second coil portion 45, as it is visible in the left half of the sectional view of FIG. 4. In other words, the coil overlapping of the coil portions 43, 44, 45 necessary for achieving the spring effect, is arranged in the circumferential portion, which is arranged opposite to the tensioning pulleys 5, 7. In total, the belt tensioning device 2 has because of this design an especially flat axial design size.

The design, especially the bearing arrangement of the tensioning arms 4, 6 is similar to the design shown in FIGS. 2a) to 2c). A special feature of the present embodiment according to FIG. 4 is, that the two tensioning arms 4, 6 are formed as metal forming parts made from sheet metal. Between a flange portion 51 of the first tensioning arm 4 and a flange portion 52 of the second tensioning arm 6, axially distanced thereto, an annular space is formed, in which the spring 8 is accommodated. The two tensioning arms 4, 6 are axially supported via an annular distance keeper 53 on each other.

Figure 5:
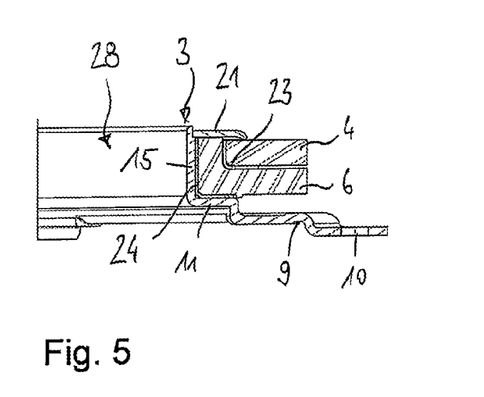
FIG. 5 illustrates a modified embodiment of a bearing arrangement for a belt tensioning device according to the invention as a detail in a half longitudinal sectional view.

FIG. 5 shows a modified embodiment for the bearing arrangement of the tensioning arms 4, 6 on the base member 3 with the tensioning arms 4, 6 nested in each other. For this the second tensioning arm 6 has in a half longitudinal sectional view an L-like contour with an inner sleeve portion which is rotatably supported on the base member 3 by means of a bearing bushing 24, and a flange portion projecting therefrom. The first tensioning arm 4 is formed disc-like and is rotatably supported on the second tensioning arm 6 by means of the interconnection of a bearing bushing 23. The axial support is achieved via the disc 21, which is connected to the basic body 3 by means of bordering the edge.

Figure 6:
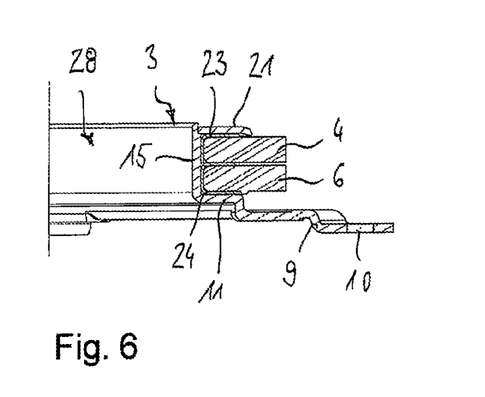
FIG. 6 illustrates a further embodiment of a bearing arrangement for a belt tensioning device according to the invention as a detail in a half longitudinal sectional view.

FIG. 6 shows a further modified embodiment for the bearing arrangement of the tensioning arms 4, 6 on the base member 3 with a parallel arrangement. In this case, the inner bearing portions of the two tensioning arms 4, 6 are arranged axially neighboring each other and are both rotatably supported by means of bearing bushings 23, 24 on the sleeve-like portion 15 of the base member 3.

Figure 7A:
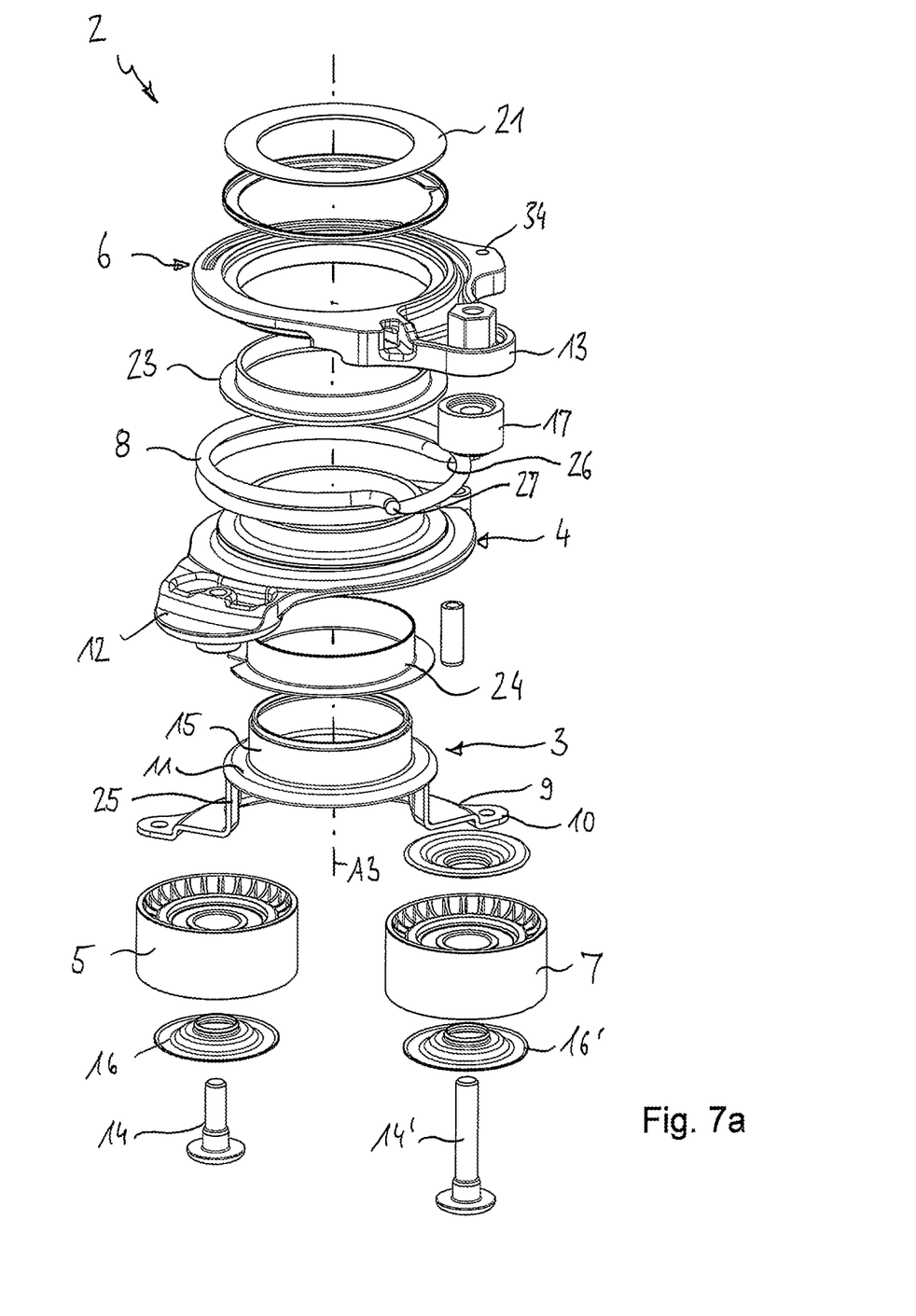
Figure 7B:
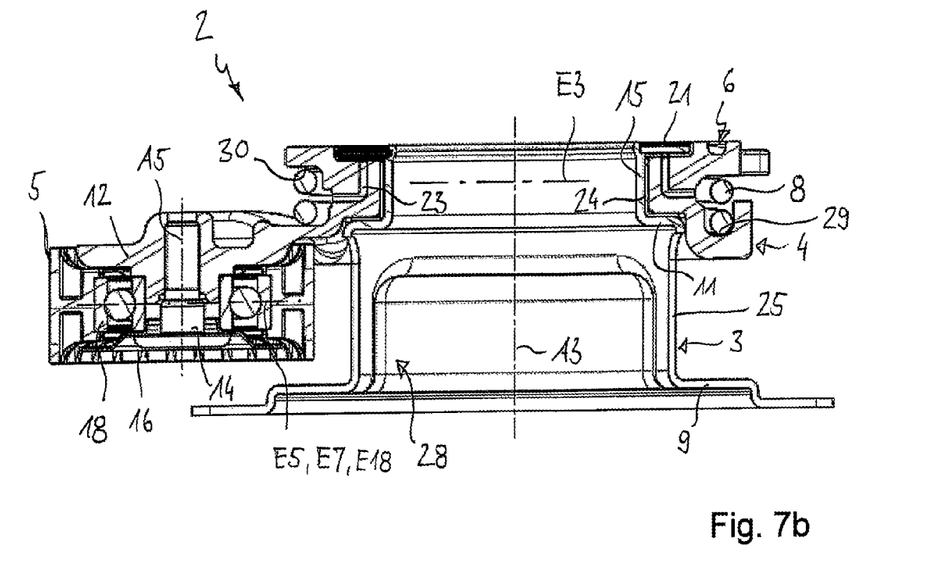

FIGS. 7a) and 7b) show a belt tensioning device 2 according to the invention in a further embodiment. This corresponds to a wide extent to the embodiment according to FIGS. 2a) to 2c), so that concerning the commonalities it is referred to the above description. In this case, the same or modified components, respectively, are provided with the same reference numerals, as in the embodiment according to FIGS. 2a) to 2c). In the following mainly the differences of the present embodiments are described.

In the embodiment according to FIGS. 7a) and 7b) the belt tensioning device 2 is formed such, that the bearing arrangement for the tensioning arms 4, 6, when seen from the unit 35, is arranged on the base member 3 behind the belt plane. This means, that a centre plane E3 of the bearing arrangement of the tensioning arms 4, 6 on the base member 3 is arranged axially offset relative to a centre plane E18 of the belt 39 in direction of the engine compartment. The belt plane E18 is the plane, which is formed by the belt centre in the assembled condition. The bearing arrangement for the tensioning arms 4, 6 is formed like that in the embodiment according to FIGS. 2a) to 2c), with the difference, that the axial orientation of the tensioning arms 4, 6, respectively of the bearing trunnions for the tensioning pulleys 5, 7 is directed towards the unit 35. The base member 3 has a relative long intermediate portion 25, which forms the opening 28, into which the drive shaft and the drive belt pulley 40 respectively extend.

Figure 8:
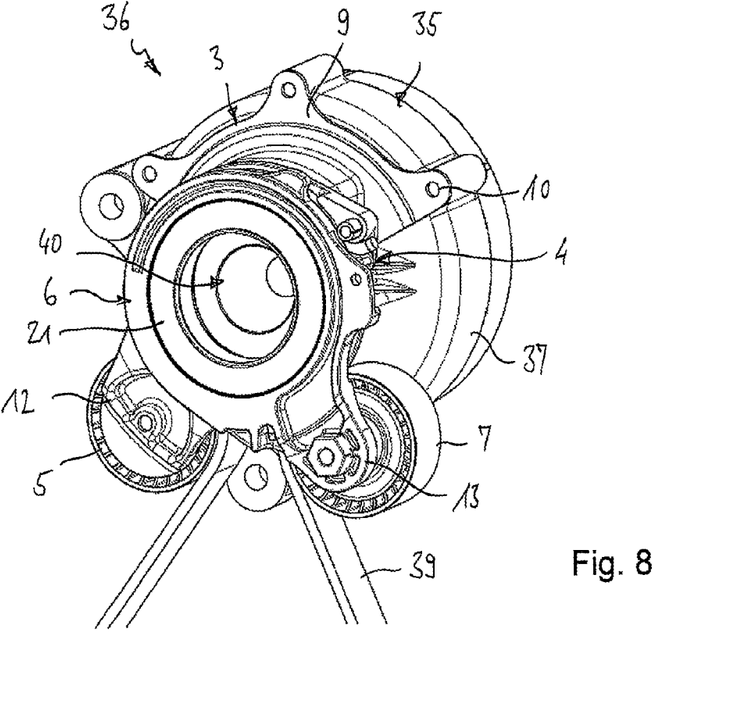
FIG. 8 an assembly according to the invention with an inventive belt tensioning device according to FIG. 7 in a perspective view.

FIG. 8 shows the belt tensioning device 2 according to the invention and according to FIGS. 7a) and 7b) in the assembled condition on a unit 35. In this case, the belt tensioning device 2 and the unit 35 form together the assembly 36. Concerning the construction of the unit and the assembly, respectively, it is referred to the above description concerning FIG. 3, which is correspondingly valid here.

A special feature of the present embodiment is, that the bearing arrangement 23, 24 of the tensioning arms 4, 6 on the base member 3, when seen from the generator, is arranged behind the belt plane, which corresponds essentially to the bearing centre plane E18 of the tensioning pulley bearings 18, 18'. The intermediate portion 25 is arranged between the attachment portion 9 and the sleeve-like portion 15 and extends in axial direction. The opening 28 formed by the intermediate portion 25, is larger than the largest outer diameter of the drive belt pulley 40. Thus, also the belt tensioning device according to the present embodiment can already be mounted on the unit with assembled drive belt pulley. In the assembled condition, the drive shaft and the drive belt pulley enters the opening 28 of the base member without contact, which is also valid for the above described embodiments. A sufficient air supply can be ensured for air-cooled generators by a variation of the diameter of the opening 28.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A belt tensioning device for a belt drive, wherein the belt drive has at least one unit with a drive shaft, a belt pulley, and a continuous belt for driving the belt pulley, the belt tensioning device comprising:
    a base member with an attachment means adapted to connect the base member to an assembly and having a sleeve-like portion with an opening into which the drive shaft extends at least partially in an assembled condition,
    two tensioning arms that are pivotably supported on the sleeve-like portion of the base member around a pivot axis and are supported relative to each other in circumferential direction via a spring, wherein the pivot axis is arranged in the assembled condition within an outer diameter of the belt pulley of the assembly, and
    two tensioning pulleys for tensioning the belt respectively and rotatably supported on the two tensioning arms around respective axes of rotation, wherein
    the spring extends around the pivot axis by at least 1.25 coils and a maximum of 2.5 coils, and the opening of the sleeve-like portion of the base member has a smallest inner diameter that is larger than a largest outer diameter of the belt pulley.

2. The belt tensioning device defined in claim 1 wherein a first coil end of the spring has an axial offset relative to a first coil region arranged at an angle of 360° around a spring axis relative to the first coil end, and wherein a second coil end has a radial offset relative to a second coil region arranged at an angle of 360° around the spring axis relative to the second coil end.

3. The belt tensioning device defined in claim 2 wherein the first coil end has an axial distance relative to the first coil region that is smaller than a three-fold of a diameter of the spring wire, and/or the second coil end has a radial distance relative to the second coil region that is smaller than the three-fold of the diameter of the spring wire.

4. The belt tensioning device defined in claim 2 wherein the first coil end has a radial overlapping relative to the first coil region, and/or the second coil end has an axial overlapping relative to the second coil region.

5. The belt tensioning device defined in claim 2 wherein a first coil portion extends from the first coil end toward the first coil region and is arranged in a first plane, and/or a second coil portion extends from the second coil end toward the second coil region and is arranged in a second plane.

6. The belt tensioning device defined in claim 5 wherein an incline portion is provided between the first coil portion and the second coil portion that extends about 45° to 90° around the spring axis.

7. The belt tensioning device defined in claim 1 wherein a ratio of a largest diameter to a largest axial length of the spring is larger than 5.0 in the assembled condition.

8. The belt tensioning device defined in claim 1 wherein a ratio of the largest radius of the spring to an axis distance between the axis of rotation of at least one of the two tensioning pulleys and the pivot axis of the two tensioning arms is smaller than 1.5.

9. The belt tensioning device defined in claim 1 wherein the spring has at least 1.25 coils and a maximum of 2.5 coils that extend around a spring axis, a first coil end has an axial offset relative to a first coil region arranged at an angle of 360° around the spring axis relative to the first coil end, and a second coil end has a radial offset relative to a second coil region arranged at an angle of 360° around the spring axis relative to the second coil end.

10. The belt tensioning device defined in claim 1 wherein the spring is arranged with pretension between the first tensioning arm and the second tensioning arm in at least one of axial direction and circumferential direction.

11. The belt tensioning device defined in claim 1 wherein the base member is a steel sheet component.

12. The belt tensioning device defined in claim 1 wherein the first and second tensioning arms are freely rotatable relative to the base member respectively across an angle range of at least 360° around the pivot axis.

13. The belt tensioning device defined in claim 1 wherein a first bearing center plane is formed by the bearings of the tensioning pulleys on the tensioning arms and a second bearing center plane is formed by the bearings of the tensioning arms on the base member, wherein the first bearing center plane and the attachment means of the base member are arranged on different sides of the second bearing center plane, or wherein the second bearing center plane and the attachment means of the base member are arranged on different sides of the first bearing center plane.

14. An assembly comprising:
    a unit with a housing,
    a drive shaft,
    a belt pulley, and
    a belt tensioning device as defined in claim 1, wherein the base member of the belt tensioning device is connected to the housing of the unit, and wherein the drive shaft extends at least partially into the opening of the base member.

* * * * *